(12) United States Patent
Evans (10) Patent No.: US 10,479,614 B2
(45) Date of Patent: Nov. 19, 2019

(54) ROLLER CONVEYOR JAM BREAK TOOL

(71) Applicant: Globe Composite Solutions, Ltd., Stoughton, MA (US)

(72) Inventor: Brian Charles Evans, Marshfield, MA (US)

(73) Assignee: Globe Composite Solutions, LLC, St. Louis, MO (US)

( * ) Notice: Subject to any disclaimer, the term of this patent is extended or adjusted under 35 U.S.C. 154(b) by 0 days.

(21) Appl. No.: 16/135,475

(22) Filed: Sep. 19, 2018

(65) Prior Publication Data

US 2019/0084771 A1 Mar. 21, 2019

Related U.S. Application Data

(60) Provisional application No. 62/560,703, filed on Sep. 20, 2017.

(51) Int. Cl.
*B65G 45/00* (2006.01)
*B65G 13/00* (2006.01)

(52) U.S. Cl.
CPC ............ *B65G 45/00* (2013.01); *B65G 13/00* (2013.01)

(58) Field of Classification Search
CPC ........ B65G 47/24; B65G 47/34; B65G 45/00; B65G 13/00

USPC .......................................................... 193/45
See application file for complete search history.

(56) References Cited

U.S. PATENT DOCUMENTS

| 4,200,185 A * | 4/1980 | Van Nocker ....... B23Q 11/0057 198/718 |
| 2017/0043957 A1* | 2/2017 | Gaille ................ B65G 21/2072 |

OTHER PUBLICATIONS www.youtube.com/watch?v=NOsU9Gs0oi8. Sep. 30, 2016 (Year: 2016).*
Globe Composite Solutions, LLC brochure. Sep. 30, 2016 (Year: 2016).*

* cited by examiner

*Primary Examiner* — James R Bidwell
(74) *Attorney, Agent, or Firm* — Crowe & Dunlevy (57) ABSTRACT

The invention relates to a roller conveyor jam break tool having a molded head member that is configured to clear a conveyor jam without the risk of the head member falling between two adjacent rollers and becoming lodged between those adjacent rollers. The molded head member is constructed of a lightweight durable, polymeric material, and the molded head member can be integrally fabricated with or selectively attached to a terminal end of an elongate handle.

38 Claims, 9 Drawing Sheets

ROLLER CONVEYOR JAM BREAK TOOL

CROSS-REFERENCE TO RELATED APPLICATIONS

This application claims the benefit of U.S. Provisional Patent Application Ser. No. 62/560,703 filed Sep. 20, 2017, and incorporates said provisional application by reference into this document as if fully set out at this point.

BACKGROUND OF THE INVENTION

1. Field of the Invention

This invention relates generally to a roller conveyor jam break tool, and more particularly to a roller conveyor jam break tool having a terminal head member configured to clear roller conveyor jams without the risk of the head member falling between two adjacent rollers and becoming lodged between the rollers.

2. Description of the Related Art

Roller conveyors of various types and configurations are frequently used by parcel and distribution companies as a means of conveying items to be manually sorted or packaged for shipment to the end customer. Due to the volume of items that flood these conveyors on the way to an operator, jams may frequently occur on the conveyor line in locations where access or reach by the operator is difficult or not possible.

Figure 2:
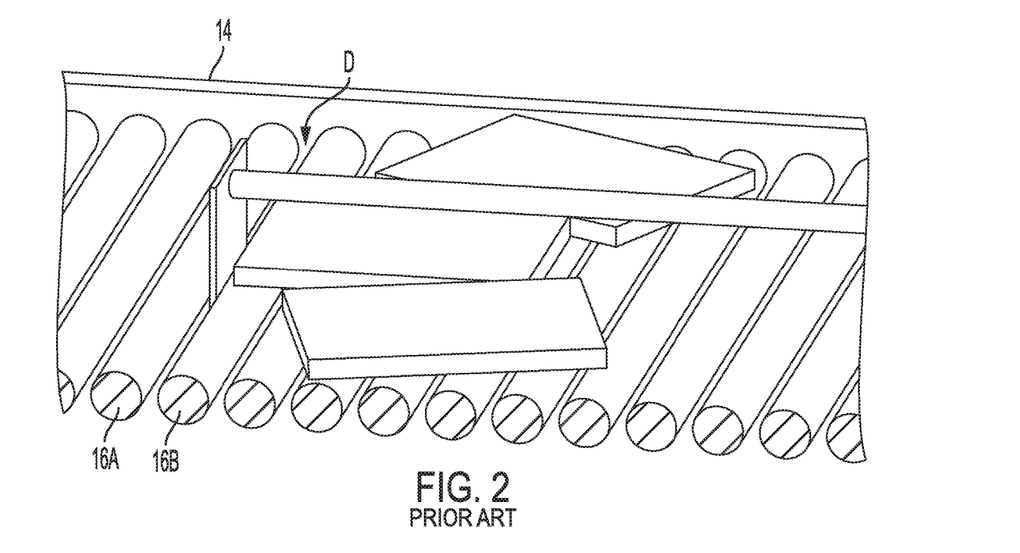
FIG. 2 is a perspective view of a prior art tool having a metal tube with a planar end plate attachment shown in use clearing a jam on a roller conveyor.

In these cases, tools are typically used as a means of extending the reach of the operator for use in clearing the jam. Prior art tools for roller conveyors are typically made by on-staff maintenance personnel with limited fabrication equipment capabilities, from commonly available materials like aluminum tube, with a flat metal (or sometimes plastic) plate that is attached to the end by welding or some type of fastening technique depending on material choice (FIG. 2). The head itself must be relatively lightweight so these end effect heads are usually thin, which easily slips between the two adjacent rollers making it difficult for the operator to pull the jammed articles towards them to clear the conveyor. Once lodged the tool becomes difficult to extract without putting severe stress on the lower back of the operator to lift the head out of the conveyor sometimes eight (8) feet away from where the operator is standing. The rollers may be power driven as well which may add to the difficulty in lifting the head out between the rollers. Moreover, these prior art tools, if metal in construction, commonly case damage to the conveyor rollers as well, which leads to costly maintenance and system downtime.

It is therefore desirable to provide an improved roller conveyor jam break tool.

It is also desirable to provide an improved molded head member for a roller conveyor jam break tool.

It is further desirable to provide a roller conveyor jam break tool having a terminal molded head member configured to clear roller conveyor jams without the head member falling between two adjacent rollers and becoming lodged between the rollers.

It is still further desirable to provide a roller conveyor jam break tool having an ergonomic design that can be easily lifted by an operator because a terminal head member of the tool cannot lodge between adjacent conveyor rollers. The ergonomic design of the jam break tool also makes it easier for the operator to pull articles towards them without fear of catching the rollers.

It is yet further desirable to provide a molded head member for a roller conveyor jam break tool that is configured to remain generally tangent to upper surfaces of the conveyor rollers such that the head member contacts the jammed articles and not the rollers.

It is still further desirable to provide a molded head member for a roller conveyor jam break tool that is lightweight and durable in construction that will not damage the conveyor rollers.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

BRIEF SUMMARY OF THE INVENTION

In general, in a first aspect, the invention relates to a roller conveyor jam break tool configured to clear jams along a conveyor that has a plurality of spaced individually rotatable rollers. The tool has a unitary head member formed from lightweight durable, polymeric material. The head member has an upper portion, a lower portion, and an upright blade extending from the upper portion to the lower portion. The lower portion of the head member has a thickness greater than a distance between two adjacent conveyor rollers of the conveyor.

The blade of the head member can be arcuate in shape from the upper portion to the lower portion of the head member. More particularly, the blade may be a concave arc from the upper portion to the lower portion of the head member or a convex arc from the upper portion to the lower portion of the head member. In addition, the lower portion of the head member may have an enlarged protuberance on a front face of the blade, on a rear face of the blade, or on both the front face and the rear face of the blade. The upper end of the blade can have a thickness less than the thickness of the lower portion of the head member, and the blade may taper from a narrower thickness to a larger thickness at a terminus of the blade. In addition, the terminus of the blade can be flat.

The tool can also include a handle receptacle longitudinally extending from a rear face of the blade. A handle having an upper terminal end with a grip and a lower terminal end may be seated in the handle receptacle of the head member.

In general, in a second aspect, the invention relates to a roller conveyor jam break tool configured to clear jams on a conveyor. The tool has a handle with an upper terminal end and a lower terminal end. The tool also has a molded head member constructed of a polymeric material that is attached to the lower terminal end of the handle. The head member has a blade extending from the upper portion to a lower portion of the head member, and the lower portion of the head member has a thickness greater than a distance between two adjacent conveyor rollers of the conveyor.

The handle can be an elongate handle with a grip on the upper terminal end. In addition, the head member can include an upper portion having a handle receptacle configured to accommodate a length of the lower terminal end of the handle. An outer diameter of the lower terminal end of the handle and an inner diameter of the handle receptacle of the molded head member may have mating annular or polygonal profiles. Moreover, a locking member can retain the lower terminal end of the handle within the handle receptacle of the head member, and the lower terminal end of the handle and the handle receptacle of the molded head member can each have aligned mounting holes for receipt of the locking member. The handle could also be integrally fabricated with the molded head member to form a unitary roller conveyor jam break tool.

The blade may be arcuate in shape from the upper portion to the lower portion of the head member, such as a concave arc from the upper portion to the lower portion of the head member or a convex arc from the upper portion to the lower portion of the head member. The lower portion of the head member can have an enlarged protuberance, such as on a front face of the blade, on a rear face of the blade, or on both the front face and the rear face of the blade. The blade may taper from a narrower thickness to a larger thickness at a terminus of the blade, and the terminus of the blade can be flat.

In general, in a third aspect, the invention relates to a roller conveyor jam break tool having an elongate handle with an upper terminal end and a lower terminal end and a molded head member attached to the lower terminal end of the handle. The head member is constructed of a polymeric material and has a blade extending from the upper portion to a lower portion. The blade is arcuate in shape from the upper portion to the lower portion of the head member with the blade having a concave arc that curves toward the elongate handle. The lower portion of the head member has an enlarged protuberance with a thickness greater than a distance between two adjacent conveyor rollers of the conveyor.

The protuberance can be on a front face of the blade, on a rear face of the blade, or on both the front face and the rear face of the blade. The head member can also have an upper portion with a handle receptacle configured to accommodate a length of the lower terminal end of the handle. An outer diameter of the lower terminal end of the handle and an inner diameter of the handle receptacle of the molded head member can have mating annular or polygonal profiles. Additionally, a locking member can lock the lower terminal end of the handle within the handle receptacle of the head member and be secured within aligned mounting holes in the lower terminal end of the handle and the handle receptacle of the molded head member. Alternatively, the handle can be integrally fabricated with the molded head member to form a unitary roller conveyor jam break tool. Further, the blade can taper from a narrower thickness to a larger thickness at a flat terminus of the blade.

The polymeric material of the head member is a thermoplastic polymeric material, a thermosetting polymeric material, or a combination thereof, and more particularly may be polyolefins, polyurethanes, phenolics, polystyrenes, polyamides, polyesters, polysulfones, poly(ether ether ketones), polyetherimides, polypropylenes, polyethylenes, polycarbonates, polyvinylchlorides, acrylonitrile butadiene styrene (ABS), acrylonitrile butadiene styrene/polycarbonate (ABS/PC), polycarbonate (PC), thermoplastic urethane elastomers (TPU), or combinations thereof.

The foregoing has outlined in broad terms some of the more important features of the invention disclosed herein so that the detailed description that follows may be more clearly understood, and so that the contribution of the named inventors to the art may be better appreciated. The invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings, wherein.

DETAILED DESCRIPTION OF THE INVENTION

While this invention is susceptible of embodiment in many different forms, there is shown in the drawings, and will herein be described hereinafter in detail, some specific embodiments of the invention. It should be understood, however, that the present disclosure is to be considered an exemplification of the principles of the invention and is not intended to limit the invention to the specific embodiments so described.

The invention relates to a roller conveyor jam break tool 10 having a molded head member 12 that is configured extend the reach of an operator 18 in order to clear a package jam along a conveyor 14. The conveyor 14 has a plurality of spaced individually rotatable rollers 16 having a width W and defining a pass line tangent PL to upper surfaces of the rollers 16. Unlike the prior art tool shown in FIG. 2, the roller conveyor jam break tool 10 provided herein is configured such that the head member 12 cannot fall in a gap or distance and become lodged between two adjacent rollers 16A, 16B of the conveyor 14. In addition, the head member 12 of the jam break tool 10 is constructed of a lightweight durable material that can be easily used without putting undue strain on the operator's 18 lower back and that upon contact will not damage the conveyor rollers 16.

Figure 1:
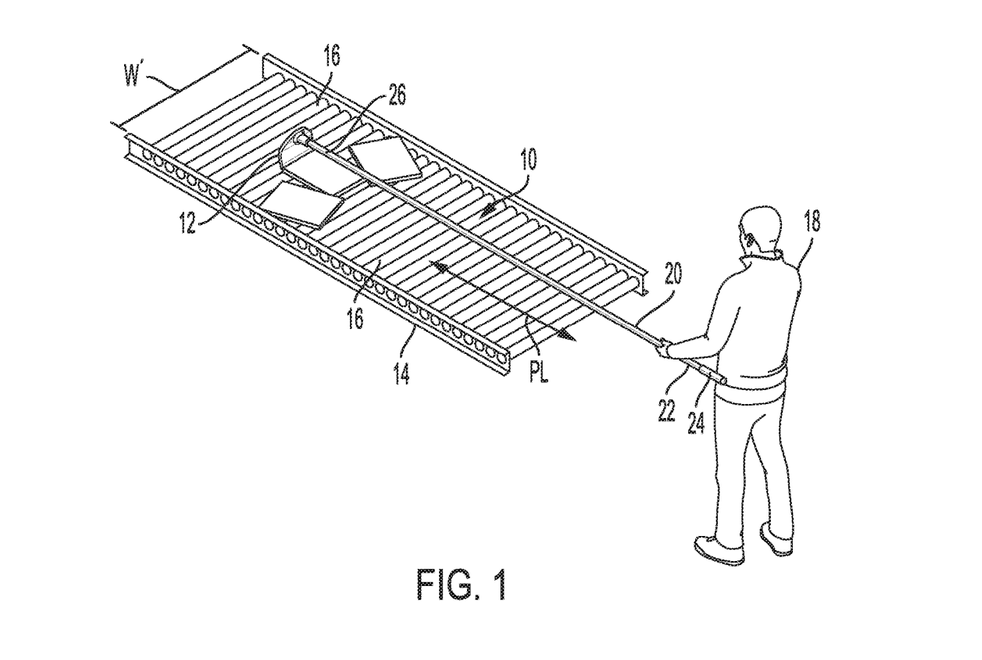
FIG. 1 is a perspective view of an example of an operator using an example of a roller conveyor jam break tool to clear a jam on a roller conveyor in accordance with an illustrative embodiment of the invention disclosed herein.
Figure 3:
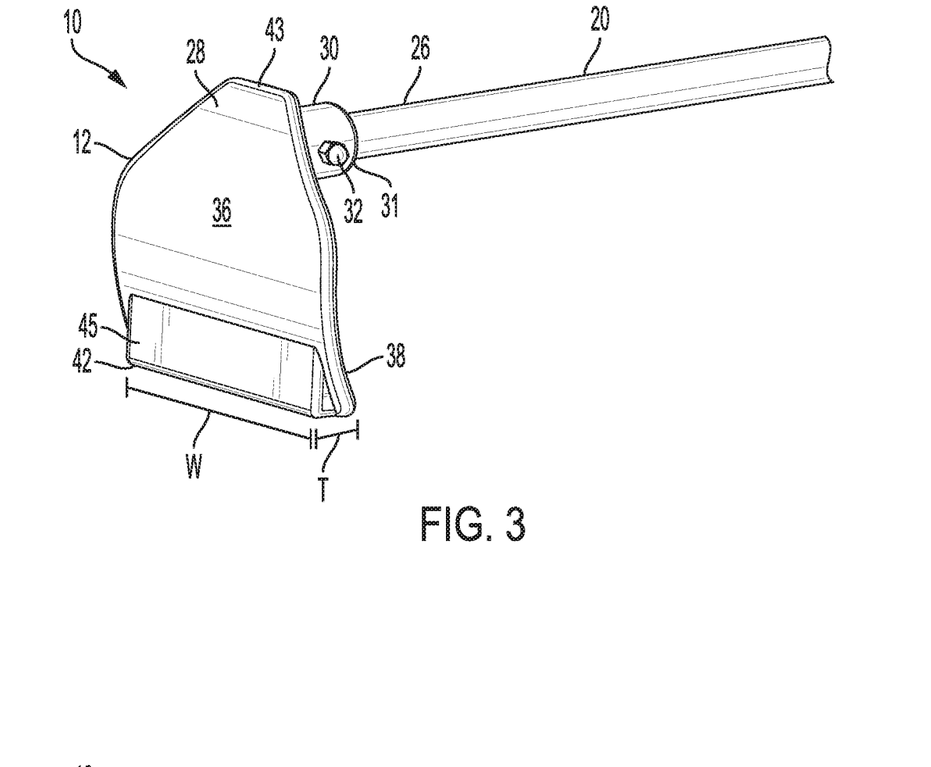
FIG. 3 is a perspective view of an example of an improved roller conveyor jam break tool in accordance with an illustrative embodiment of the invention disclosed herein.
Figure 4:
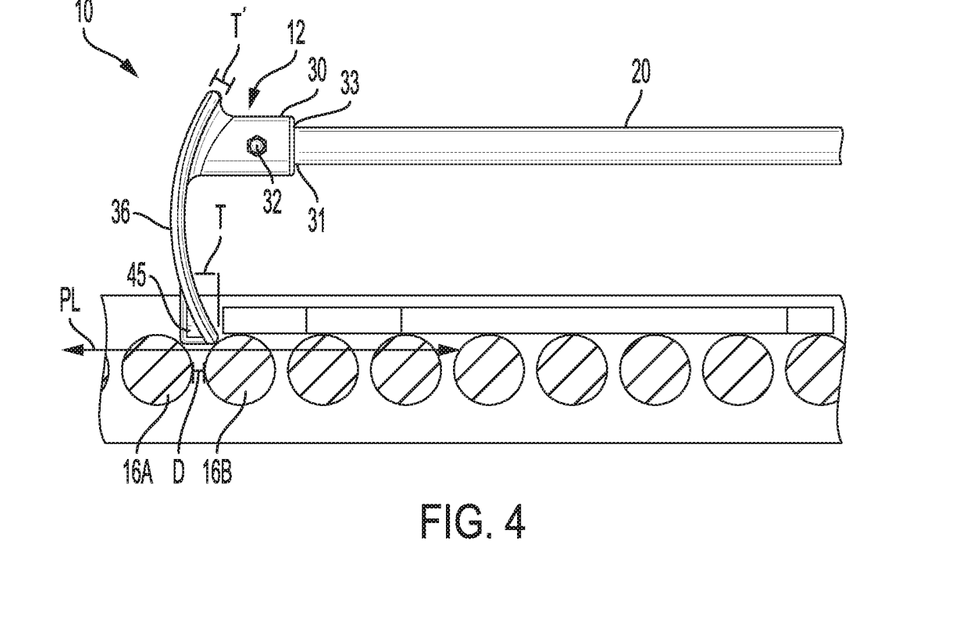
FIG. 4 is a side elevation view of the roller conveyor jam break tool illustrated in FIG. 3 shown in use clearing a jam on a roller conveyor in accordance with an illustrative embodiment of the invention disclosed herein.
Figure 5A:
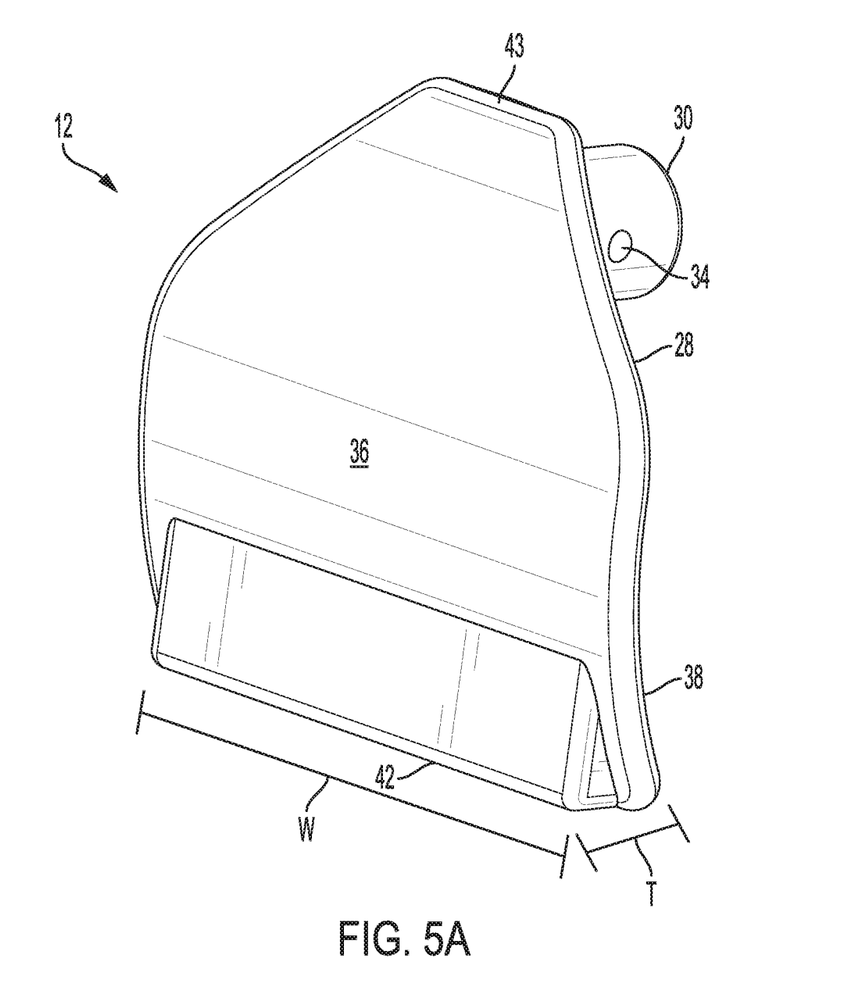
FIG. 5A is a front perspective view of an example of a molded head member for a roller conveyor jam break tool in accordance with an illustrative embodiment of the invention disclosed herein.
Figure 5B:
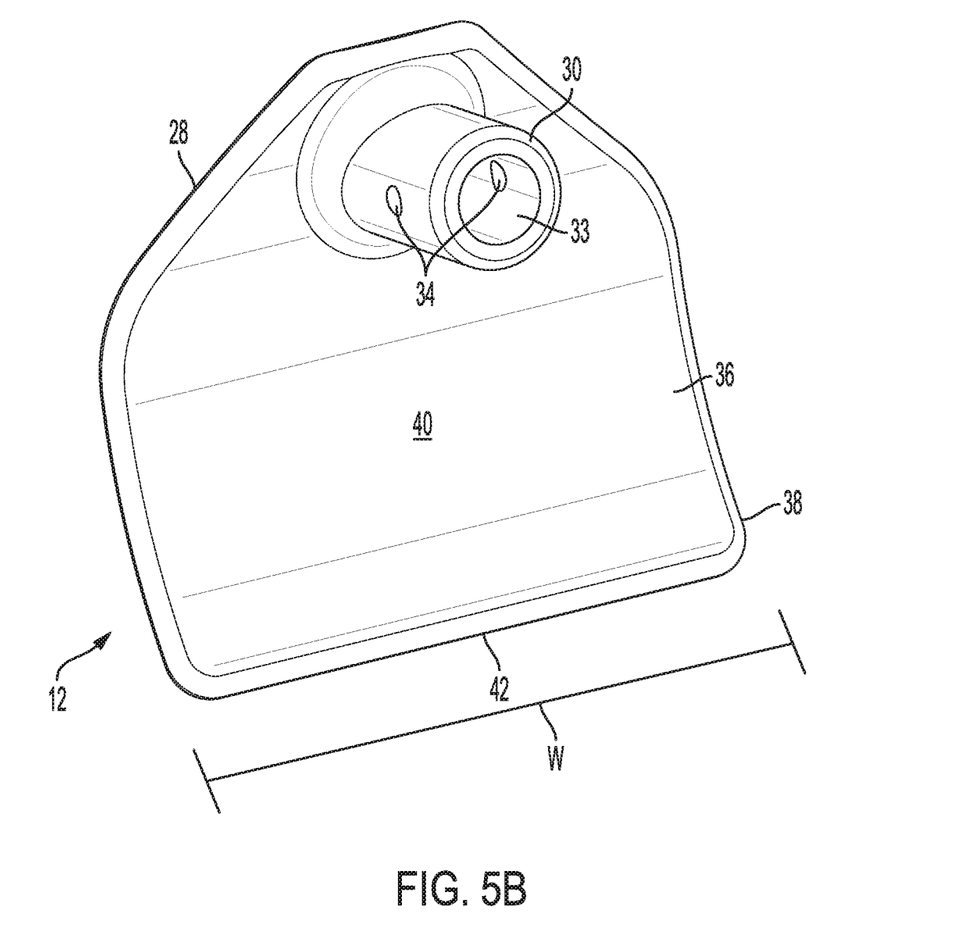
FIG. 5B is a rear perspective view of the molded head member shown in FIG. 5A.
Figure 6:
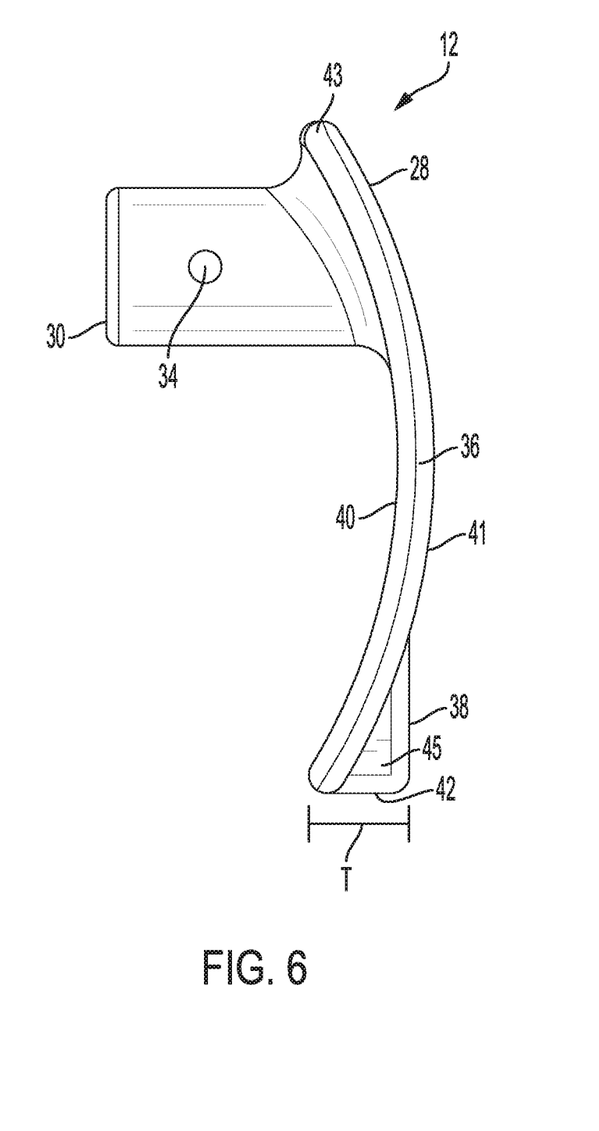
FIG. 6 is a side elevation view of the molded head member shown in FIG. 5A, and the opposite side is a mirror image thereof.
Figure 7:
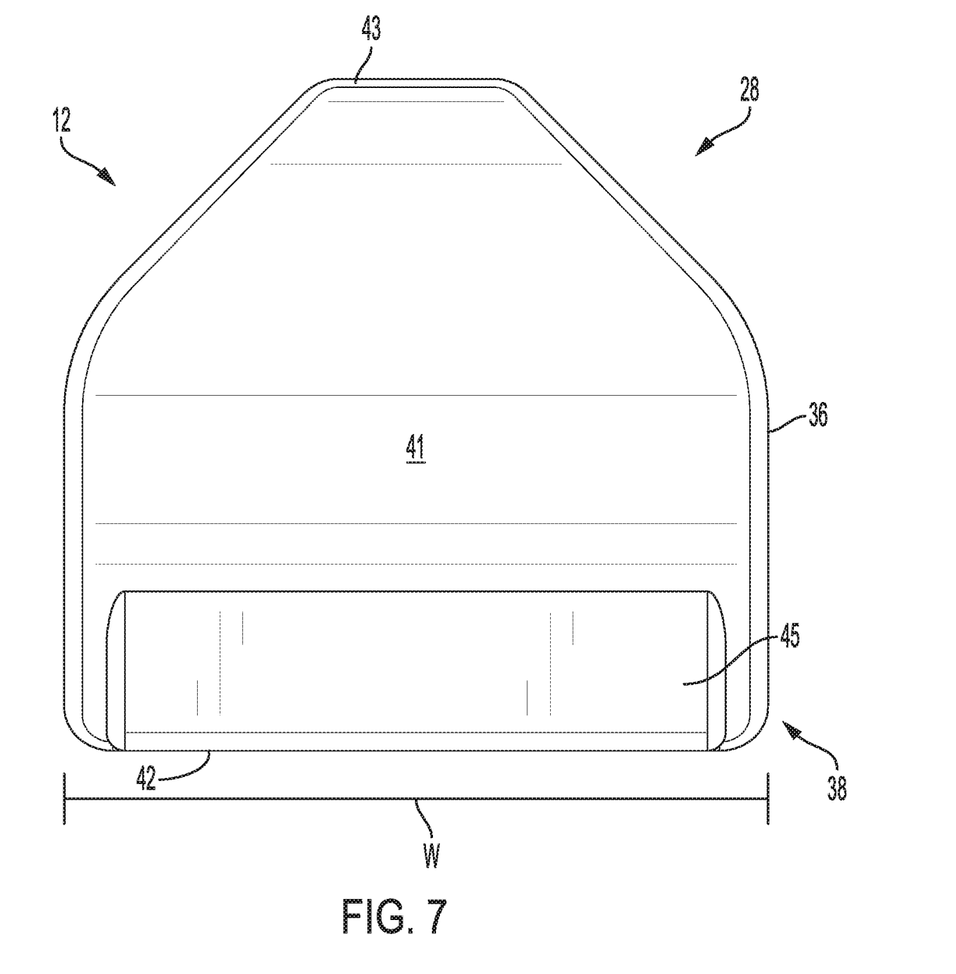
FIG. 7 is a front elevation view of the molded head member shown in FIG. 5A.
Figure 8:
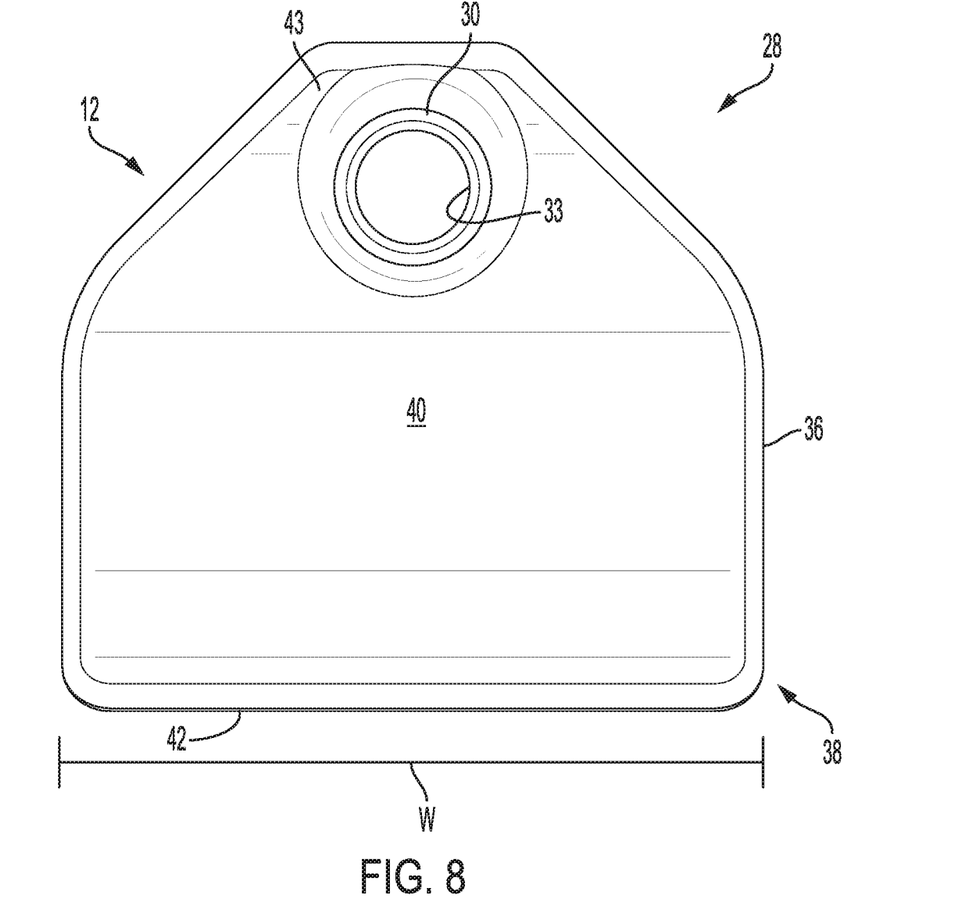
FIG. 8 is a rear elevation view of the molded head member shown in FIG. 5A.
Figure 9:
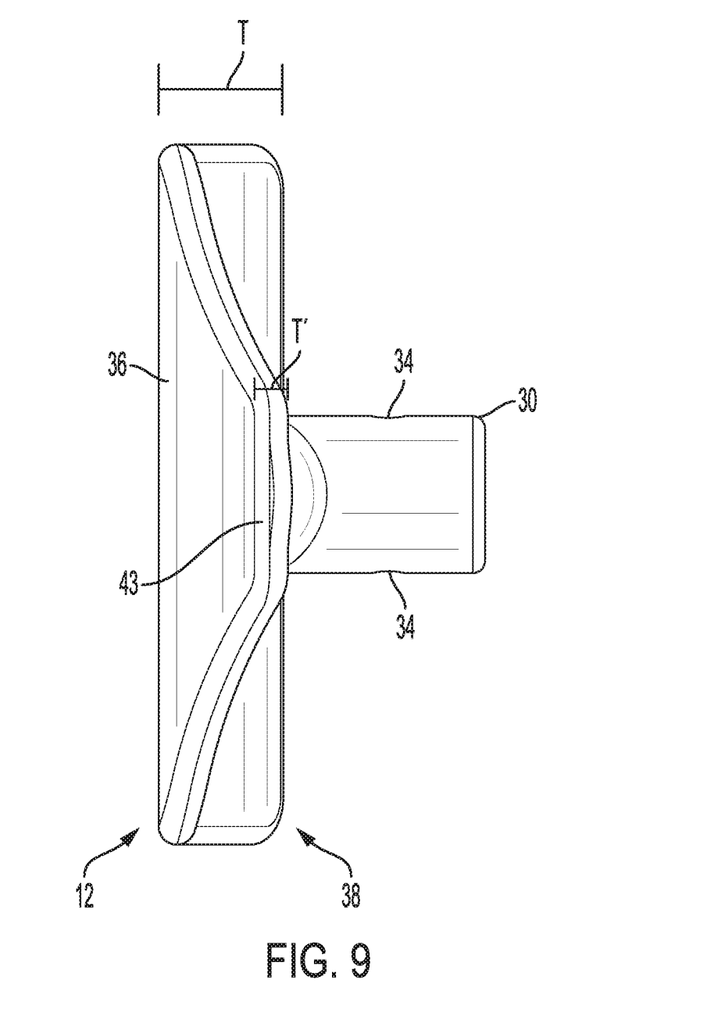
FIG. 9 is a top elevation view of the molded head member shown in FIG. 5A.
Figure 10:
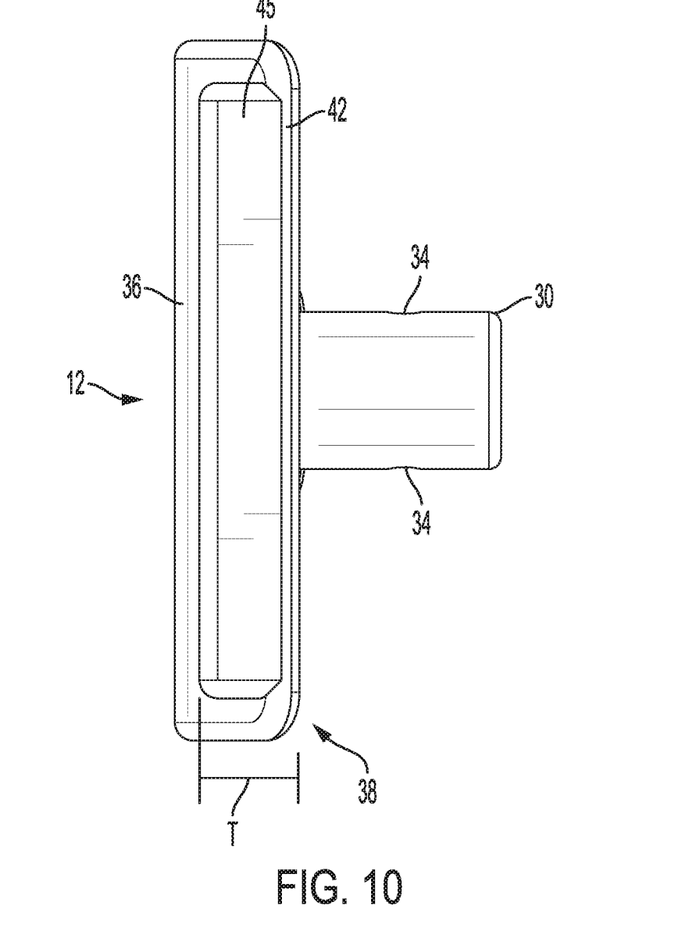
FIG. 10 is a bottom elevation view of the molded head member shown in FIG. 5A.

The roller conveyor jam break tool 10 can include an elongate handle 20 having an upper terminal end 22 with a grip 24 (FIG. 1) and a lower terminal end 26 that is attached to or integrally fabricated with the molded head member 12 (FIGS. 1, 3, and 4). An upper portion 28 of the molded head member 12 can include a handle receptacle 30 that accommodates a length of the lower terminal end 26 of the elongate handle 20. The lower terminal end 26 of the handle 20 can have an outer diameter 31 that is annular or polygonal in shape, and an inner diameter 33 of the handle receptacle 30 of the molded head member 12 can have a corresponding annular or polygonal profile. A locking member 32 (e.g., a bolt and nut, a lock pin, a cotter pin, depressible detents, or the like), can be used for retaining the lower terminal end 26 of the handle 20 seated within the handle receptacle 30 of the head member 12, and the lower terminal end 26 of the handle 20 and the handle receptacle 30 of the molded head member 12 can each have aligned mounting holes 34 for receipt of the locking member 32.

The handle 20 can be constructed of a lightweight durable material, such as metal (e.g., steel, stainless steel, thin walled aluminum, anodized aluminum), fiberglass, carbon composites, polymeric materials, or the like, that permit the jam break tool 10 to be easily lifted by the operator 18 in order to pull items towards them without fear of catching the rollers 16.

The molded head member 12 has a unitary construction formed from a polymeric material. The molded head member 12 includes an upright blade 36, and as exemplified in the drawings, the blade 36 is arcuate in shape from the upper portion 28 to a lower portion 38 of the head member 12. The arcuate shape of the blade 36 can be concave and curve inward towards the handle 20, or the blade 36 can be convex and curve outwards away from the handle 20. As noted above, the upper portion 28 of the molded head member 12 can have the handle receptacle 30 longitudinally extended from a rear face 40 of the blade 36.

The lower portion 38 of the molded head member 12 has a width W that is less than a width W' of the conveyor rollers 16. The lower portion 38 of the molded head member 12 has a thickness T that is greater than a gap or distance D between two adjacent conveyor rollers 16A, 16B, thereby preventing the molded head member 12 from falling between and becoming lodged between the adjacent rollers 16A, 16B. A front face 41 of the blade 36 can have a protuberance 45 at the lower portion 38 of the head member 12, but the invention is not so limited; the protuberance 45 can protrude from the rear face 40 of the blade 36 at the lower portion 38 of the head member 12. The thickness T of the lower portion 38 of the head member 12 can be selectively adjustable in order to accommodate varying conveyor roller types, sizes and applications. Also as shown in the drawings, an upper end 43 of the blade 36 can have a thickness T' that is less than a thickness T of a terminus 42 of the blade 36 or of the lower portion 38 of the head member 12.

The molded head member 12 can be constructed of a lightweight durable, polymeric material that will not damage the conveyor rollers 16 upon contact. The head member 12 of the jam break tool 10 can be constructed using a single polymeric material or using multiple polymeric materials, and for added rigidity, the head member 12 can be formed as stratified layers or multi-layers of polymeric materials. The polymeric material(s) used to construct the molded head member 12 can be any single or combination of suitable rigid thermoplastic or thermosetting polymeric materials, such as polyolefins, polyurethanes, phenolics, polystyrenes, polyamides, polyesters, polysulfones, poly(ether ether ketones), polyetherimides, polypropylenes, polyethylenes, polycarbonates, polyvinylchlorides, acrylonitrile butadiene styrene (ABS), acrylonitrile butadiene styrene/polycarbonate (ABS/PC), polycarbonate (PC), thermoplastic urethane elastomers (TPU) and/or any other rigid thermoplastic material known to persons skilled in the art. Material colors can also be varied in the choice of the different polymeric materials, including inserting translucent or transparent layers to create a particular aesthetic effect for example. The head member 12 can be manufactured using open casting, centrifugal molding, compression molding, injection molding, liquid injection molding, foaming, or any other molding methods known to persons skilled in the art.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

For purposes of the instant disclosure, terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

Thus, the invention is well adapted to carry out and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A roller conveyor jam break tool configured to clear jams along a conveyor, said conveyor having a plurality of spaced individually rotatable rollers, said tool comprising:
a unitary head member formed from lightweight durable, polymeric material; said head member comprising an upper portion, a lower portion, and an upright blade extending from said upper portion to said lower portion; said lower portion of said head member having a thickness greater than a distance between two adjacent conveyor rollers of said conveyor.

2. The tool of claim 1 wherein said blade is arcuate in shape from said upper portion to said lower portion of said head member.

3. The tool of claim 2 wherein said blade forms a concave arc from said upper portion to said lower portion of said head member or forms a convex arc from said upper portion to said lower portion of said head member.

4. The tool of claim 1 wherein said lower portion of said head member comprises an enlarged protuberance.

5. The tool of claim 4 wherein said protuberance is on a front face of said blade, on a rear face of said blade, or on both said front face and said rear face of said blade.

6. The tool of claim 1 wherein said upper end of said blade has a thickness less than said thickness of said lower portion of said head member.

7. The tool of claim 6 wherein said blade tapers from a narrower thickness to a larger thickness at a terminus of said blade.

8. The tool of claim 7 wherein said terminus of said blade is flat.

9. The tool of claim 1 wherein said polymeric material comprises a thermoplastic polymeric material, a thermosetting polymeric material, or a combination thereof.

10. The tool of claim 9 wherein said polymeric material is selected from the group consisting of polyolefins, polyurethanes, phenolics, polystyrenes, polyamides, polyesters, polysulfones, poly(ether ether ketones), polyetherimides, polypropylenes, polyethylenes, polycarbonates, polyvinylchlorides, acrylonitrile butadiene styrene (ABS), acrylonitrile butadiene styrene/polycarbonate (ABS/PC), polycarbonate (PC), thermoplastic urethane elastomers (TPU), or combinations thereof.

11. The tool of claim 1 further comprising a handle receptacle longitudinally extending from a rear face of said blade.

12. The tool of claim 11 further comprising a handle having an upper terminal end with a grip and a lower terminal end seated in said handle receptacle of said head member.

13. A roller conveyor jam break tool configured to clear jams on a conveyor, said tool comprising:
a handle having an upper terminal end and a lower terminal end; and
a molded head member constructed of a polymeric material; said head member attached to said lower terminal end of said handle; said head member further comprising a blade extending from said upper portion to a lower portion of said head member; wherein said lower portion of said head member has a thickness greater than a distance between two adjacent conveyor rollers of said conveyor.

14. The tool of claim 13 wherein said handle is an elongate handle with a grip on said upper terminal end.

15. The tool of claim 13 wherein said head member further comprises an upper portion having a handle receptacle configured to accommodate a length of said lower terminal end of said handle.

16. The tool of claim 15 wherein an outer diameter of said lower terminal end of said handle and an inner diameter of said handle receptacle of said molded head member having mating annular or polygonal profiles.

17. The tool of claim 15 further comprising a locking member for retaining said lower terminal end of said handle within said handle receptacle of said head member.

18. The tool of claim 17 wherein said lower terminal end of said handle and said handle receptacle of said molded head member each have aligned mounting holes for receipt of said locking member.

19. The tool of claim 13 wherein said handle is integrally fabricated with said molded head member to form a unitary roller conveyor jam break tool.

20. The tool of claim 13 wherein said blade is arcuate in shape from said upper portion to said lower portion of said head member.

21. The tool of claim 20 wherein said blade forms a concave arc from said upper portion to said lower portion of said head member or forms a convex arc from said upper portion to said lower portion of said head member.

22. The tool of claim 13 wherein said lower portion of said head member comprises an enlarged protuberance.

23. The tool of claim 22 wherein said protuberance is on a front face of said blade, on a rear face of said blade, or on both said front face and said rear face of said blade.

24. The tool of claim 22 wherein said blade tapers from a narrower thickness to a larger thickness at a terminus of said blade.

25. The tool of claim 24 wherein said terminus of said blade is flat.

26. The tool of claim 13 wherein said polymeric material of said molded head member comprises a thermoplastic polymeric material, a thermosetting polymeric material, or a combination thereof.

27. The tool of claim 26 wherein said polymeric material is selected from the group consisting of polyolefins, polyurethanes, phenolics, polystyrenes, polyamides, polyesters, polysulfones, poly(ether ether ketones), polyetherimides, polypropylenes, polyethylenes, polycarbonates, polyvinylchlorides, acrylonitrile butadiene styrene (ABS), acrylonitrile butadiene styrene/polycarbonate (ABS/PC), polycarbonate (PC), thermoplastic urethane elastomers (TPU), or combinations thereof.

28. A roller conveyor jam break tool configured to clear jams on a conveyor, said tool comprising:
an elongate handle having an upper terminal end and a lower terminal end; and
a molded head member constructed of a polymeric material; said head member attached to said lower terminal end of said handle; said head member further comprising a blade extending from said upper portion to a lower portion of said head member; said blade being arcuate in shape from said upper portion to said lower portion of said head member; said blade having a concave arc that curves toward said elongate handle; said lower portion of said head member comprising an enlarged protuberance having a thickness greater than a distance between two adjacent conveyor rollers of said conveyor.

29. The tool of claim 28 wherein said protuberance is on a front face of said blade, on a rear face of said blade, or on both said front face and said rear face of said blade.

30. The tool of claim 28 wherein said head member further comprises an upper portion having a handle receptacle configured to accommodate a length of said lower terminal end of said handle.

31. The tool of claim 30 wherein an outer diameter of said lower terminal end of said handle and an inner diameter of said handle receptacle of said molded head member having mating annular or polygonal profiles.

32. The tool of claim 31 further comprising a locking member for retaining said lower terminal end of said handle within said handle receptacle of said head member.

33. The tool of claim 32 wherein said lower terminal end of said handle and said handle receptacle of said molded head member each have aligned mounting holes for receipt of said locking member.

34. The tool of claim 28 wherein said handle is integrally fabricated with said molded head member to form a unitary roller conveyor jam break tool.

35. The tool of claim 28 wherein said blade tapers from a narrower thickness to a larger thickness at a terminus of said blade.

36. The tool of claim 35 wherein said terminus of said blade is flat.

37. The tool of claim 28 wherein said polymeric material of said molded head member comprises a thermoplastic polymeric material, a thermosetting polymeric material, or a combination thereof.

38. The tool of claim 37 wherein said polymeric material is selected from the group consisting of polyolefins, polyurethanes, phenolics, polystyrenes, polyamides, polyesters, polysulfones, poly(ether ether ketones), polyetherimides, polypropylenes, polyethylenes, polycarbonates, polyvinylchlorides, acrylonitrile butadiene styrene (ABS), acrylonitrile butadiene styrene/polycarbonate (ABS/PC), polycarbonate (PC), thermoplastic urethane elastomers (TPU), or combinations thereof.

\* \* \* \* \*